July 14, 1953 C. T. TAYLOR 2,645,054
DOUBLE-DUTY FISHHOOK
Filed July 12, 1950
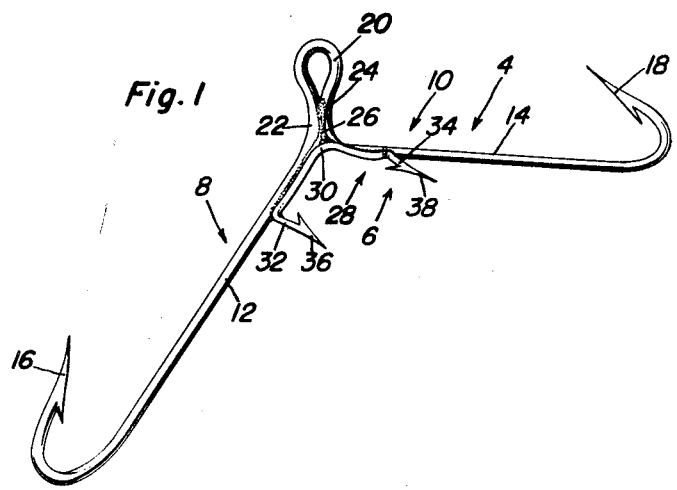
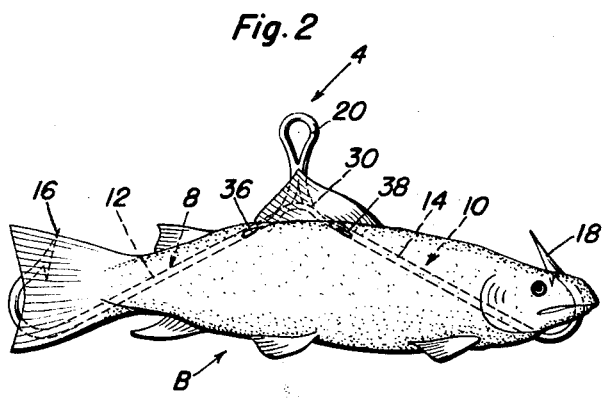
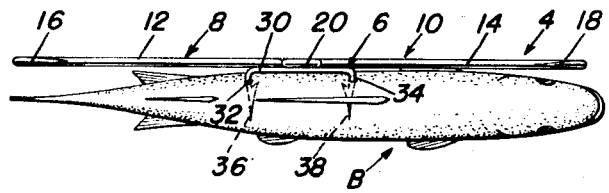
Cloyd T. Taylor
INVENTOR.

Patented July 14, 1953

2,645,054

UNITED STATES PATENT OFFICE 2,645,054

DOUBLE-DUTY FISHHOOK

Cloyd T. Taylor, Traverse City, Mich.

Application July 12, 1950, Serial No. 173,261

1 Claim. (Cl. 43—44.2)

The present invention relates to certain new and useful improvements in fishhooks and has reference in particular to a novel fishhook construction which is characterized by twin hooks and means thereon whereby a live bait, a minnow for instance, may be successfully attached for sure catch results.

One object of the invention has to do with a two-in-one fishhook construction which may be aptly and satisfactorily used for still fishing and also for trolling. The preferred construction is such that the collective features coordinate in producing a well balanced over-all fishhook construction wherein the bait holding means contains the bait in a normal life-like swimming position. The holding means is such in construction and position that the live minnow, when latter is used, cannot turn sideways or upside down, which so often happens with competitive fishhook constructions.

Novelty is also predicated upon an improved fishhook construction the design of which is simplicity itself, whereby to promote easy handling, use and operation.

Further novelty is predicated on a fishhook construction wherein the straight shank portions of the companion fishhooks are disposed in divergent relationship and connected at their inner adjacent ends with a line eye, the bait holding means being centered in relation to the position of the eye and hooks on the outer ends of the shank portions so that when the minnow is attached its position obscures the main hooks in a manner to attract instead of scaring away the potential victim.

Then, too, novelty is predicated on the chosen location of the outstanding bait barbs, these being at right angles to the plane of the stated shanks and on opposite sides of the line eye so that when the minnow is impaled thereon, by pushing the barbs through the base of the top back fin, he will be allowed to live and swim indefinitely and will have complete freedom of movement of head and tail without straining interference from the stated barbs.

Another object is to locate the main hooks so that one is at the head of the bait and the other at the tail in which relationship it is almost impossible for the fish to take the bait without being hooked. Not only this the front hook almost invariably lodges itself in the roof of the mouth which, it can be substantiated, seems to be the best place to sink the hook and keep the fish unquestionably on the line.

In carrying out the invention a construction is had in which manufacturers, users and others will find their essential needs fully met, contained and effectually available.

Other objects and advantages will become more readily apparent from the following description and drawing.

In the accompanying sheet of drawings wherein like numerals are employed to designate like parts throughout the views:

Fig. 1 is a perspective view of a double duty or so-called two-in-one fishhook constructed in accordance with the principles of the instant invention;

Fig. 2 is a side elevational view showing the manner in which the live bait (minnow) is attached and used; and Fig. 3 is a top plan view of the asemblage seen in Fig. 2.

Referring now to the views of the drawing by reference numerals and accompanying lead lines it will be seen that the over-all construction is essentially characterized by two units; namely, the fishhook construction or means 4 and the bait holding means 6.

The fishhook construction 4 is characterized by a pair of substantially duplicate fishhooks 8 and 10 respectively. Each has a linearly straight shank portion and the shank portions are here denoted by the numerals 12 and 14. At their outer ends these shanks are provided with customary barbed hooks 16 and 18 respectively and the barbed portions are directed toward each other. The inner adjacent ends of the shanks 12 and 14 are connected with the stem portions 22 and 24 of the eye. As a matter of fact the complete unit 4 is preferably constructed from a single length of material which is bent between its ends to form the eye, the lateral stem elements 22 and 24 and the hooked shanks The stem portions 22 and 24 are soldered or otherwise secured together at 26. It will be noted in this connection that the shanks 12 and 14 are in divergent relationship and so the unit 4 is of general V-shaped form and provides a suitable crotch to accommodate the bait holding means 6. The means 6 is preferably in the form of a substantially U-shaped unit 28 the bight portion 30 of which is soldered to the shanks 12 and 14 in the manner shown. The free end portions 32 and 34 are at right angles to the respective shanks and terminate in bait holding barbs 36 and 38. Each shank is therefore provided with an outstanding barb and the barbs are on opposite sides of the eye 20 and are relatively close together and at an elevation where they are ideal for attachment and maintenance of the bait B as shown in Figs. 2 and 3.

As before mentioned the barbs 36 and 38 are pushed into the base of the top back fin in the manner shown in the drawing. In this way the head of the bait is opposed to the hook 18 and the tail is opposed to the hook 16 and thus both hooks are partially concealed in this manner. Nevertheless the bait, if it be a minnow, will have full freedom of action and will live and swim indefinitely as is clear from the disclosure.

If any other bait besides minnows is used, the effectiveness of the fishhook is just as good; as it holds the bait in such a position that a hook is at each end of the bait. Therefore, if it is a worm that is being used as bait, the worm is hooked on one hook, then wrapped around hook and then the barbs of bait holder are fastened to center of worm and then the other end of worm is fastened to other hook so that the worm is held in a normal, life shape and position. Also, the extra hook and bait holder make it possible to accommodate more bait than possible on other types of fishhooks.

The device can be made in any size according to size of fish to be caught and according to size and kind of bait used. If minnows are used as bait the hook size to be used will be the size that allows hook to reach just to the tail and head of bait.

Also, another great advantage this hook has over any other style hook, is that as soon as a fish bites, the hook can be jerked instantly and the fish will be hooked. In other styles of hooks the bait has to be swallowed first so as to be sure the hook is in the fish's mouth. With this construction there is a saving of bait used, as the fish cannot steal the bait as is possible with old style bait hooks.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

A live bait fishhook construction of the type described comprising a one-piece substantially V-shaped fishhook adapted to parallel a bait when the latter is attached thereto and of a length approximating the over-all length of the applied bait and embodying a centrally situated line eye and a pair of linearly straight shanks having their corresponding inner ends integral with opposite portions of said eye and having their opposite ends diverging outwardly from said eye and terminating at their respective outer ends in barbed hooks having the barbed portions facing towards each other and also facing towards said eye, said eye, shanks and hooks all being in a common plane, one of said hooks being adapted to penetrate the head portion of the bait, and the other hook being adapted to penetrate the tail portion of said bait, and a substantially U-shaped member having an approximately V-shaped bight portion superimposed against, secured to and bridging the existing crotch at the juncture of said eye and said shanks and also having lateral ends projecting from the intermediate portions of said shanks at right angles in respect to said common plane and terminating in bait impaling barbs, the latter being in positions relative to said shanks, eye and barbed hooks to properly penetrate the base portion of the dorsal fin of the bait at longitudinally spaced points on said fin.

CLOYD T. TAYLOR.

References Cited in the file of this patent

UNITED STATES PATENTS

| Number | Name | Date |
|---|---|---|
| 605,538 | Dempsey | June 14, 1898 |
| 805,284 | Greenway et al. | Nov. 21, 1905 |
| 2,047,676 | Edmondson | July 14, 1936 |
| 2,051,651 | Pachner et al. | Aug. 18, 1936 |

FOREIGN PATENTS

| Number | Country | Date |
|---|---|---|
| 336,483 | France | Mar. 10, 1904 |